(12) United States Patent
Elson et al.

(10) Patent No.: US 10,814,697 B2
(45) Date of Patent: Oct. 27, 2020

(54) RADIANT HEATING SYSTEM WITH INFRARED SENSORS FOR TEMPERATURE FEEDBACK CONTROL

(71) Applicant: FORD GLOBAL TECHNOLOGIES, LLC, Dearborn, MI (US)

(72) Inventors: John Craig Elson, Bloomfield Township, MI (US); James George Gebbie, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 429 days.

(21) Appl. No.: 15/679,785

(22) Filed: Aug. 17, 2017

(65) Prior Publication Data
US 2019/0054801 A1   Feb. 21, 2019

(51) Int. Cl.
| | | |
|---|---|---|
| *H05B 3/02* | (2006.01) | |
| *H05B 1/02* | (2006.01) | |
| *B60L 1/02* | (2006.01) | |
| *B60H 1/22* | (2006.01) | |
| *B60H 1/00* | (2006.01) | |
| *G01J 5/00* | (2006.01) | |

(52) U.S. Cl.
CPC ......... *B60H 1/2218* (2013.01); *B60H 1/2226* (2019.05); *B60H 1/00742* (2013.01); *B60H 2001/2265* (2013.01); *G01J 2005/0092* (2013.01); *H05B 1/0236* (2013.01); *H05B 2203/032* (2013.01)

(58) Field of Classification Search
CPC .......... B60H 1/00742; B60H 1/2218; B60H 1/2226; B60H 2001/2265; G01J 2005/0092; H05B 1/0236; H05B 2203/032

USPC .............. 219/202, 480-487, 509-518, 219/443.1-448.11
See application file for complete search history.

(56) References Cited

U.S. PATENT DOCUMENTS

| | | |
|---|---|---|
| 4,920,759 A | 5/1990 | Tanaka et al. |
| 5,400,964 A | 3/1995 | Freiberger |
| 8,362,398 B2 | 1/2013 | Heiden et al. |
| 8,884,191 B2 | 11/2014 | Ogino et al. |
| 2010/0130808 A1 | 5/2010 | Hattori |
| 2012/0104954 A1* | 5/2012 | Huang ............... H05B 47/11 315/158 |
| 2014/0360998 A1 | 12/2014 | Berger |
| 2015/0028119 A1 | 1/2015 | Satzger et al. |
| 2015/0267881 A1* | 9/2015 | Salter .................. F21K 9/64 362/84 |
| 2019/0070930 A1* | 3/2019 | Bando ............ B60H 1/00849 |

FOREIGN PATENT DOCUMENTS

DE   102012221116 A1   5/2014

OTHER PUBLICATIONS

English Machine Translation of DE102012221116A1.

* cited by examiner

*Primary Examiner* — Sang Y Paik
(74) *Attorney, Agent, or Firm* — David Coppiellie; King & Schickli, PLLC (57) ABSTRACT

A radiant heating system includes a radiant heating zone, a first radiant heating feature on a first side of the radiant heating zone and a second radiant heating feature on a second side of the radiant heating zone opposite the first side. A method of radiant heating is also disclosed.

13 Claims, 13 Drawing Sheets

RADIANT HEATING SYSTEM WITH INFRARED SENSORS FOR TEMPERATURE FEEDBACK CONTROL

TECHNICAL FIELD

This document relates generally to radiant heating systems and, more particularly, to a radiant heating system incorporating infrared sensors to provide temperature feedback from a target located in a radiant heating zone. Such a radiant heating system has particular advantageous application in the motor vehicle field.

BACKGROUND

Radiant heating is a technology that provides heat through infrared (IR) radiation. Radiant heating technology is beginning to be effectively implemented in motor vehicles.

Radiant heating panels are most efficient and effective when the face of the radiant heating panel is normal to the target surface to be heated. Heating efficiency is detrimentally affected as the angle between the radiant heating panel and the target surface to be heated gets further and further away from zero degrees.

Radiant heating panels are powered by the vehicle to create and maintain comfort in cold conditions. The temperature of the skin or clothing covering the skin should be maintained within a certain range for optimum comfort. Accordingly, a need to heat the coldest areas first as well as to regulate the heat effect produced by the IR radiation to maintain comfort and conserve energy during operation.

This document relates to a new and improved radiant heating system utilizing one or more IR sensors to determine the presence of a target surface to be warmed in a radiant heating zone as well as directly measure the temperature of the target surface to be heated to provide precise control of heating leading to greater comfort.

Advantageously, not only does such a system increase user comfort, it also allows for deactivating of radiant heating elements that are inefficiently heating occupants of the motor vehicle thereby saving energy. Advantageously the system also allows for the targeting of the coldest parts of the occupant first to efficiently use energy to provide a rapid warming effect or sensation to the occupant on cold winter days and nights. As such, the present radiant heating system represents a significant advance in the art.

SUMMARY

In accordance with the purposes and benefits described herein, a new and improved radiant heating system is provided. That radiant heating system comprises a radiant heating zone, a first radiant heating feature on a first side of the radiant heating zone and a second radiant heating feature across the radiant heating zone from the first side. This means that some part of the radiant heating zone is between the first radiant heating feature and the second radiant heating feature.

The first radiant heating feature may include a radiant heat source and a first IR sensor feature. The second radiant heating feature may include a second IR sensor feature. In other embodiments, the second radiant heating feature may be an IR specular element for reflecting IR radiation. In still other embodiments the second radiant heating feature may be a second radiant heat source and a second IR sensor feature.

The first radiant heat source may be a first radiant heating panel and the second radiant heat source may be a second radiant heating panel.

In other possible embodiments the first radiant heat source may be a first plurality of radiant heating panels and the second radiant heat source may be a second plurality of radiant heating panels. Still further, in some of the many possible embodiments of radiant heating systems, the first IR sensor feature may comprise a first plurality of IR sensors. Further, one IR sensor of the plurality of IR sensors may be provided upon each of the first plurality of radiant heating panels.

Still further, in some of the many possible embodiments of radiant heating system, the second IR sensor feature may comprise a second plurality of IR sensors. One IR sensor of the second plurality of IR sensors may be provided on each of the second plurality of radiant heating panels.

In still other possible embodiments of the radiant heating system, the first radiant heating feature may include at least one near-IR emitter and the second radiant heating feature may further include at least one near-IR sensor. In still other possible embodiments of the radiant heating system, the first radiant heating feature may include a first mood lighting source and the second radiant heating feature may further include a first mood lighting sensor. In some of the many possible embodiments, the first radiant heating feature may further include a second mood lighting sensor and a second radiant heating feature may include a second mood lighting source.

The radiant heating system may further include a controller configured to control operation of the first radiant heating feature and the second radiant heating feature. The controller may be further configured to respond to detection of a target to be heated in the radiant heating zone. That radiant heating zone may comprise, for example, a footwell of a motor vehicle.

In accordance with an additional aspect, a method of radiant heating is provided. That method comprises the steps of providing a first radiant heating feature adjacent a radiant heating zone, providing a second radiant heating feature across the radiant heating zone from the first radiant heating feature, detecting the presence of a target to be heated in the radiant heating zone and directing radiant heat toward that target.

The method may further include the step of using IR sensors to detect the presence of the target in the radiant heating zone. Those IR sensors may also be utilized to monitor the heating and, therefore, the comfort level of an occupant's skin or clothing targets in the radiant heating zone.

The method may also include the step of using a near-IR emitter and a cooperating near-IR sensor to detect the presence of a target in the radiant heating zone. In other possible embodiments, the method may include using a mood lighting source and a cooperating mood lighting sensor to detect the presence of the target in the radiant heating zone.

In substantially any of the possible embodiments, the method may also include the step of configuring a controller to control the first radiant heating feature and the second radiant heating in response to detecting the presence of the target in the radiant heating zone and the heat level of the target in that zone.

In the following description, there are shown and described several preferred embodiments of the radiant heating system and related heating method. As it should be realized, the radiant heating and related method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the radiant heating system and related heating method and together with the description serve to explain certain principles thereof.

Reference will now be made in detail to the present preferred embodiments of the radiant heating system and heating method, examples of which are illustrated in the accompanying drawing figures.

DETAILED DESCRIPTION

Reference is now made to FIGS. 1a-1d illustrating a first embodiment of a radiant heating system 10. The radiant heating system 10 includes radiant heating zone 12. A first radiant heating feature, generally designated by reference numeral 14, is provided adjacent to or on a first side of the radiant heating zone 12 and a second radiant heating feature, generally designated by reference numeral 16, is provided across the radiant heating zone from the first side. In the illustrated embodiment, the first radiant heating feature 14 is opposite the second radiant heating feature 16.

Figure 1A:
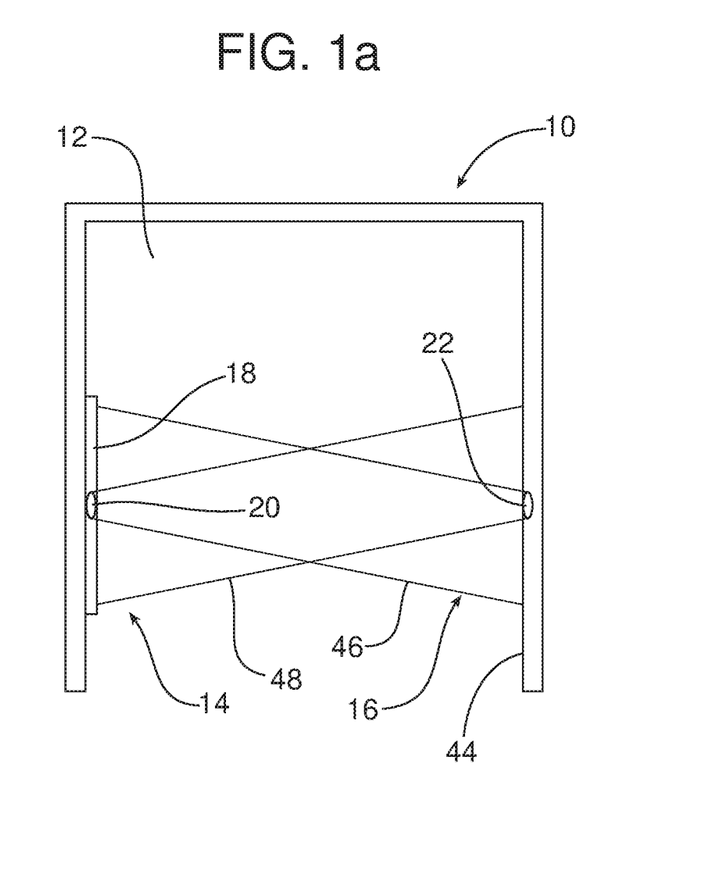
FIG. 1a is a schematic illustration of a first embodiment of the radiant heating system illustrating operation of that radiant heating system when no target is located in the radiant heating zone.
Figure 1B:
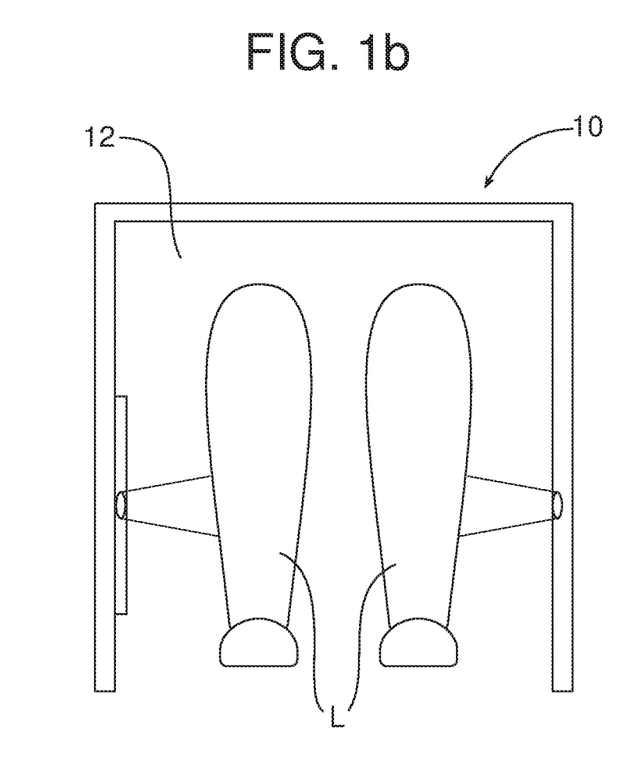
FIG. 1b is a view similar to FIG. 1a but illustrating operation of the radiant heating system when a target is located in the radiant heating zone.

More specifically, the first radiant heating feature 14 includes a radiant heat source in the form of a radiant heating panel 18 and a first IR sensor feature 20. The second radiant heating feature 16 includes a second IR sensor feature 22.

Figure 1C:
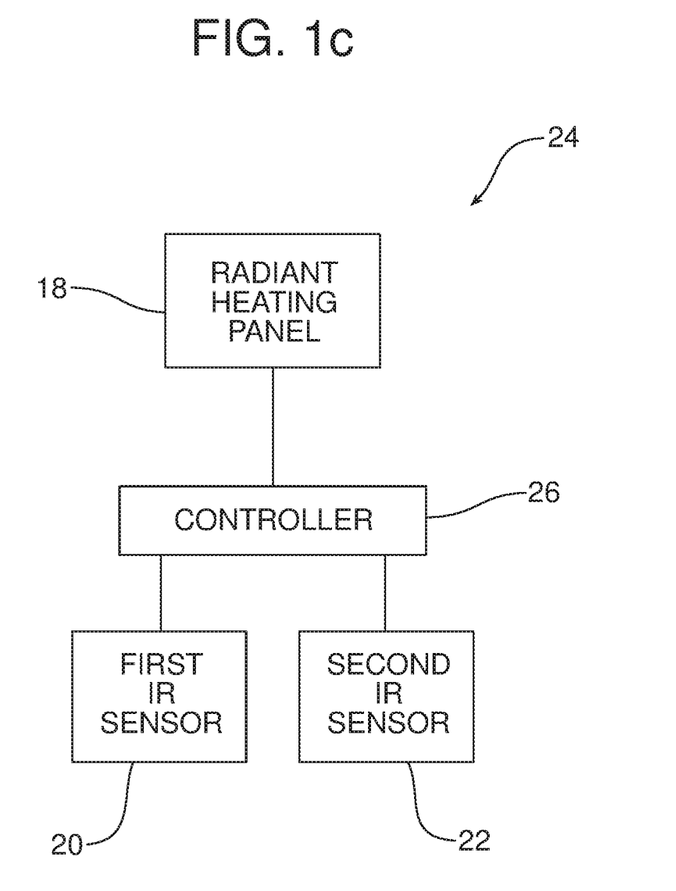
FIG. 1c is a schematic block diagram illustrating the control architecture for the radiant heating system embodiment illustrated in FIGS. 1a-1b.

As further illustrated in FIG. 1c, the radiant heating system 10 includes a control architecture 24 comprising a controller 26 connected to the radiant heating panel 18, the first IR sensor feature 20 and the second IR sensor feature 22.

The controller 26 may comprise a computing device such as a dedicated microprocessor or an electronic control unit (ECU) operating in accordance with instructions from appropriate control software. Thus, as illustrated in FIG. 1d, the controller 26 may comprise one or more processors 28, one or more memories 30 and one or more network interfaces 32 all in communication with each other over a communication bus 34.

Figure 1D:
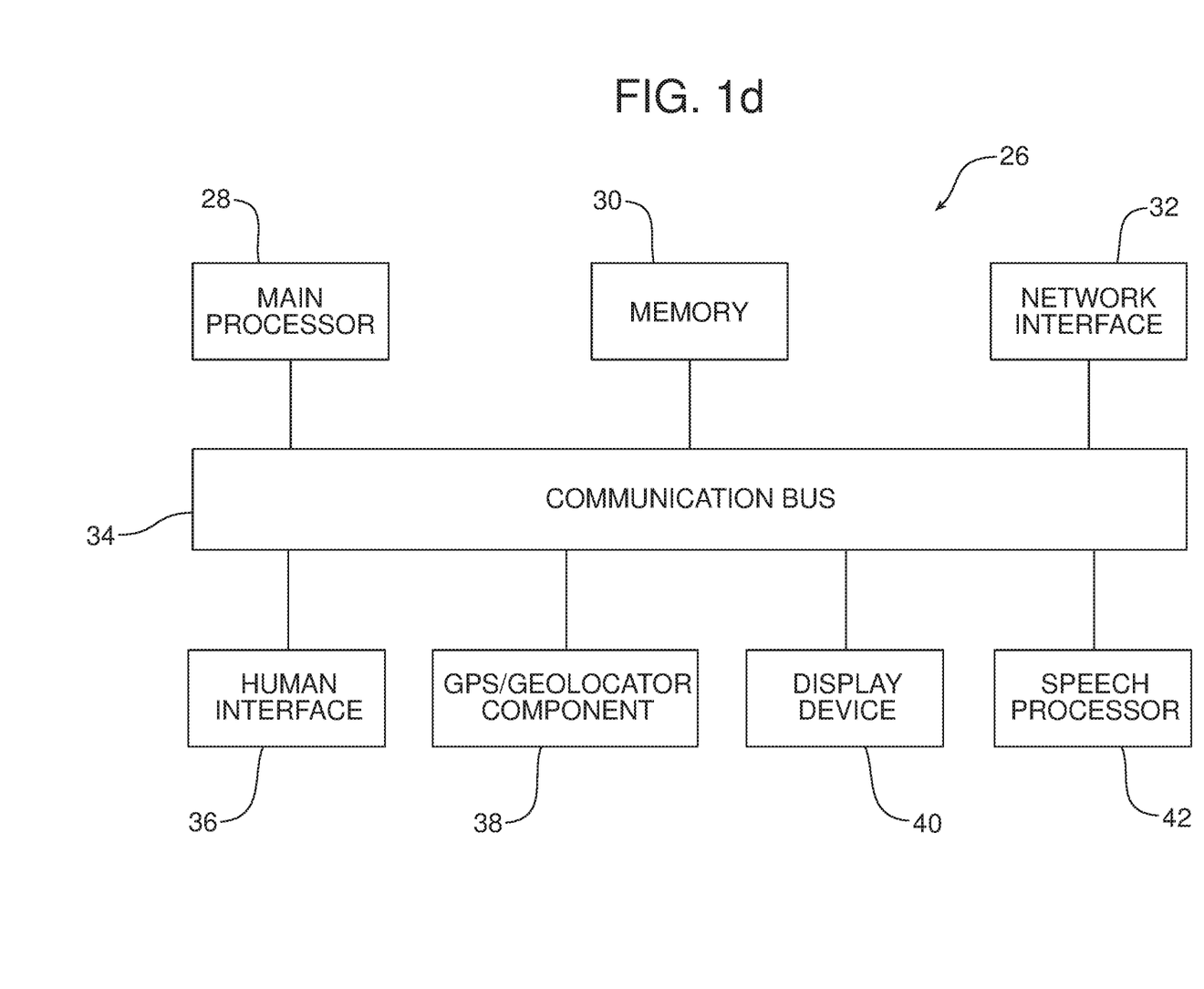
FIG. 1d is a schematic block diagram of the controller of the radiant heating system.

As further illustrated in FIG. 1d, the controller may also include a human interface 36, a GPS/geolocator component 38, a display device 40 such as a multi-function display with touchscreen capability and even a speech processor 42. The human interface 36 or the touchscreen display device 40 allow the operator to provide manual inputs and programming to control the operation of the radiant heating system 10 and the controller 26. The speech processor 42, if present, may provide voice command capability.

The radiant heating panel 18 may be activated and controlled by occupant input at the human interface 36 or display device 40, by voice command through the speech processor 42 or by automatic control by the controller 26. The first IR sensor feature 20, integrated into the radiant heating panel 18, detects the temperature of the far side or wall 44 (note detection cone 46). The second IR sensor feature 22 detects the temperature of the radiant heating panel 18 (note detection cone 48) when there is no object or target in the radiant heating zone as shown in FIG. 1a.

This current temperature data is provided by the first IR sensor feature 20 and the second IR sensor feature 22 to the controller 26. In response to that temperature data indicating that there is no target in the radiant heating zone 12, the controller 26 is configured to deactivate the radiant heating panel 18 and conserve energy.

FIG. 1b illustrates the radiant heating system when one or more target objects are present in the radiant heating zone 12. In the illustrated embodiment, that radiant heating zone 12 is a footwell and the two target objects are the legs L of a motor vehicle occupant. When the radiant heating panel 18 is activated at a time when the legs L or other target is present in the radiant heating zone 12, the first IR sensor feature 20 and the second IR sensor feature 22 both detect the temperature of the clothing covering the legs and or skin temperature. Significantly, the second IR sensor 22 is at least partially blocked by the legs L from detecting the temperature of the radiant heating panel 18. When this temperature data is provided by the first IR sensor feature 20 and second IR sensor feature 22 to the controller 26, the controller 26 recognizes the presence of a target in the radiant heating zone 12. Thus, the controller 26 is configured to maintain the radiant heating panel 18 in an activated state to provide IR radiation to heat the legs L until the occupant provides a deactivation signal through the human interface 36, the display device 40 or the speech processor 42 or temperature data provided by the first IR sensor feature 20 and second IR sensor feature 22 indicate that the legs L or target are at a desired temperature at which time the controller is configured to operate the radiant heating panel 18 to maintain that desired temperature for the comfort of the occupant sitting in the radiant heating zone 12.

Figure 2A:
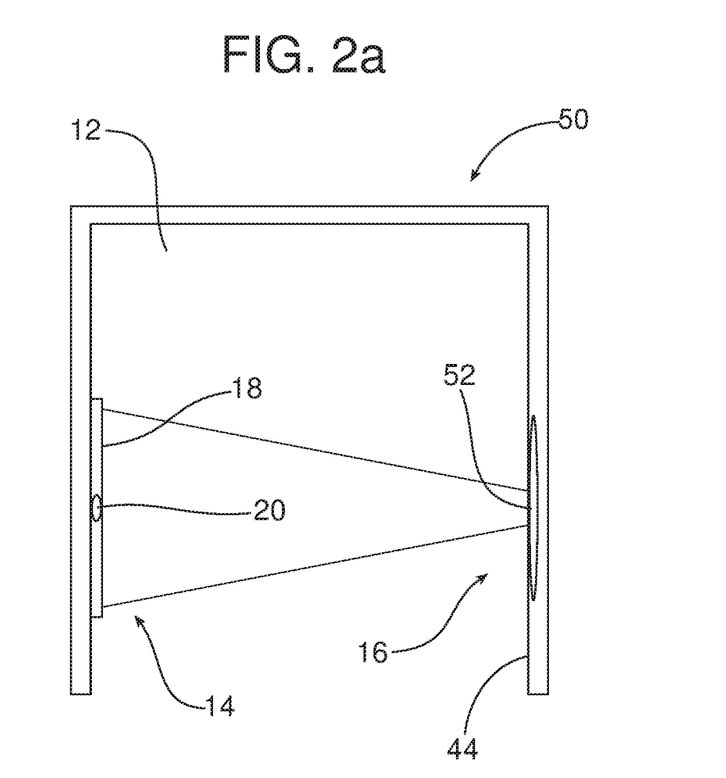
FIG. 2a is a schematic illustration of a second embodiment of the radiant heating system illustrating operation of that radiant heating system when no target is located in the radiant heating zone.
Figure 2B:
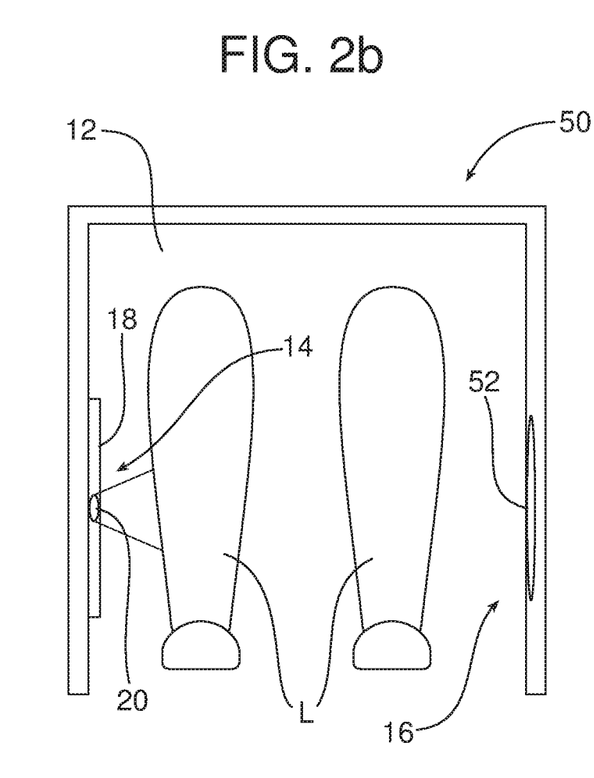
FIG. 2b is a view similar to FIG. 2a but illustrating operation of the radiant heating system when a target is located in the radiant heating zone.

FIGS. 2a and 2b illustrate another possible embodiment of radiant heating system 50. The first radiant heating feature of this second embodiment of radiant heating system 50 is identical to the first radiant heating feature 14 of the first radiant heating system 10 and as such is identified with like reference numbers. Thus, as shown, the first radiant heating feature 14 of the radiant heating system 50 includes a radiant heating panel 18 and a first IR sensor feature 20.

The second radiant heating feature of the radiant heating system 50 simply comprises an IR specular element 52 for reflecting infrared radiation from the radiant heating panel 18 back across the radiant heating zone 12 toward the radiant heating element.

As illustrated in FIG. 2a, when the radiant heating panel 18 is activated by occupant input or auto control, the first IR sensor feature 20 detects the IR radiation from the radiant heating panel 18 being reflected by the IR specular element 52 on the far sidewall 44 of the radiant heating zone 12. This temperature data is provided by the first IR sensor feature 20 to the controller 26 which recognizes an indication of no target in the radiant heating zone 12. In such a situation, the controller 26 is configured to deactivate the radiant heating panel 18 in order to conserve energy.

Figure 2C:
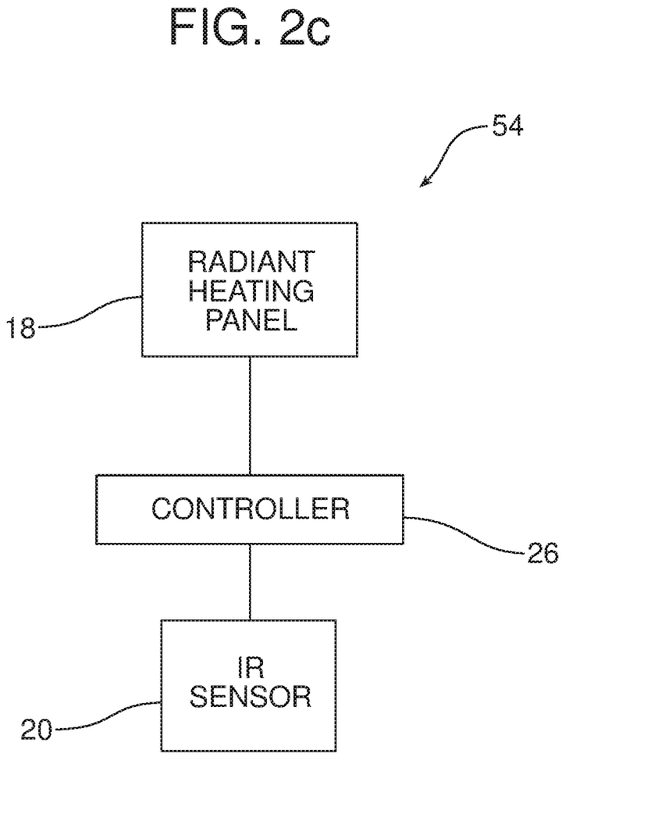
FIG. 2c is a schematic block diagram illustrating the control architecture for the radiant heating system embodiment illustrated in FIGS. 2a-2b.

In contrast, as illustrated in FIG. 2b, when a target such as the legs L are present in the radiant heating zone 12, infrared radiation emitted by the radiant heating panel 18 is blocked from reaching the IR specular element 52 and then reflected back to the first IR sensor 20. That temperature data is provided to the controller 26 by the first IR sensor 20 so that the controller recognizes a target presence condition. Thus in this situation, the controller 26 is configured to maintain the radiant heating panel 18 in the activated state until the radiant heating panel is deactivated manually or by temperature feedback control as noted above with respect to the first embodiment of radiant heating system 10 illustrated in FIGS. 1a-1d. FIG. 2c illustrates the control architecture 54 for the radiant heating system 50 wherein the controller 26 is operatively connected to the radiant heating panel 18 and the IR sensor feature 20.

Figure 3A:
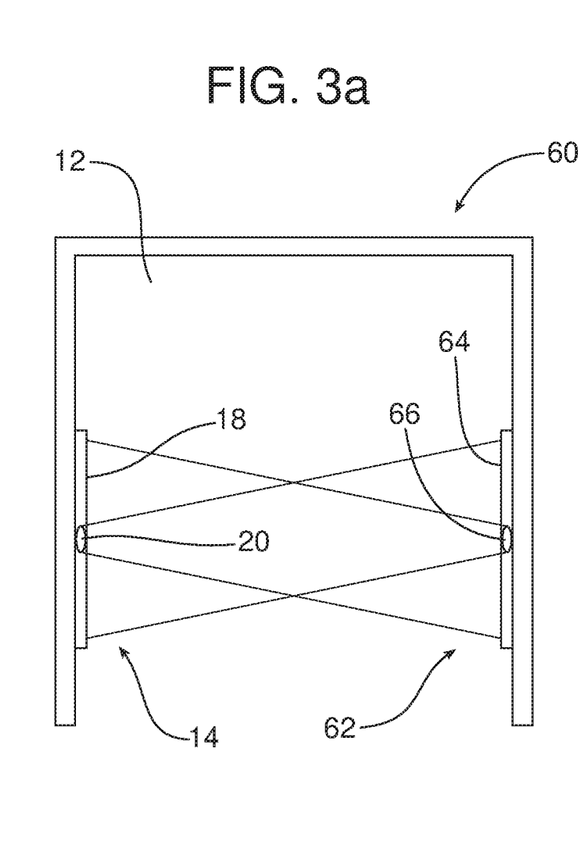
FIG. 3a is a schematic illustration of a third embodiment of the radiant heating system illustrating operation of that radiant heating system when no target is located in the radiant heating zone.
Figure 3B:
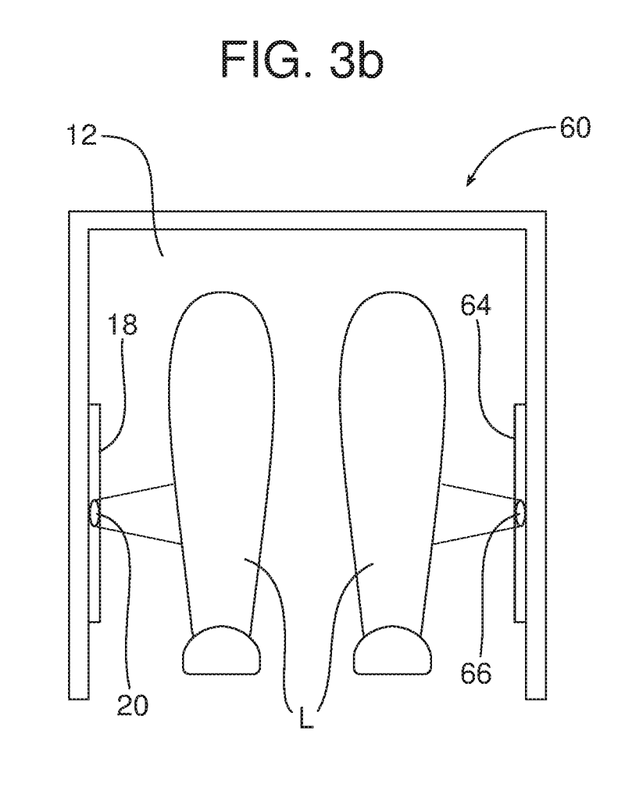
FIG. 3b is a view similar to FIG. 3a but illustrating operation of the radiant heating system when a target is located in the radiant heating zone.
Figure 3C:
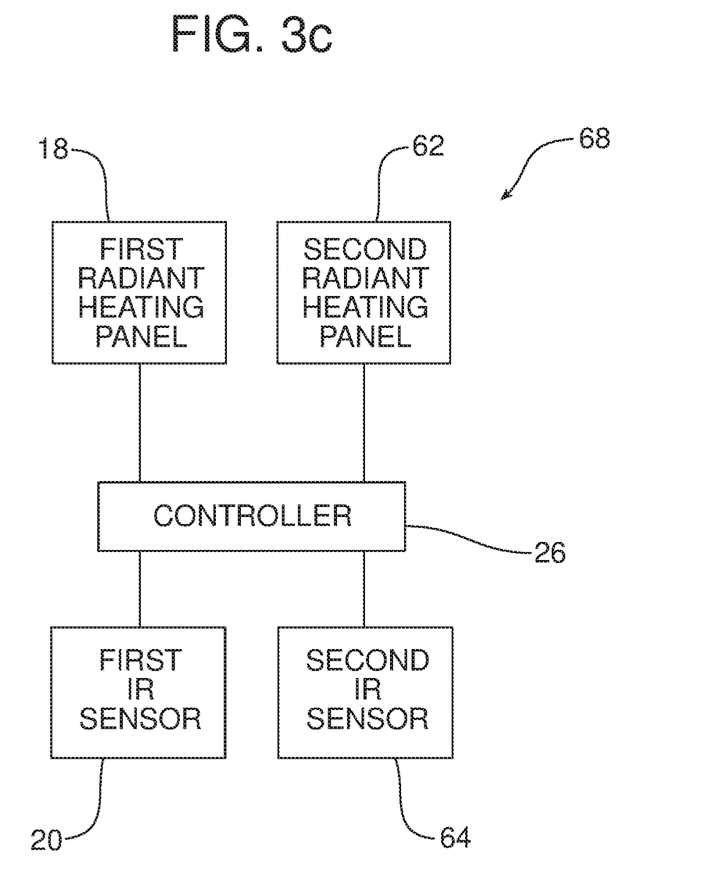
FIG. 3c is a schematic block diagram illustrating the control architecture for the radiant heating system embodiment illustrated in FIGS. 3a-3b.

FIGS. 3a-3c illustrate yet another possible embodiment of radiant heating system 60. In this embodiment, the first radiant heating feature 14 is identical to the first radiant heating feature of the FIG. 1 embodiment and includes a first radiant heating panel 18 and a first IR sensor feature 20. The second radiant heating feature 62 includes a second radiant heating panel 64 and a second IR sensor feature 66. FIG. 3c illustrates the control architecture 68 for the radiant heating system 60. As shown, the controller 26 is operatively connected to the first radiant heating panel 18, the second radiant heating panel 62, the first IR sensor feature 20 and the second IR sensor feature 66.

FIG. 3a illustrates the operation of the radiant heating system 60 when no target is present in the radiant heating zone 12. More specifically, when the first and second radiant heating panels 18, 62 are initially activated by occupant input or auto control, the first IR sensor feature 20 detects the temperature of the second radiant heating panel 62 while the second IR sensor feature 64 detects the temperature of the first radiant heating panel 18. Such data input to the controller 26 by the first and second IR sensor features 20, 64 is indicative of no object or target in the radiant heating zone 12 and, accordingly, the controller 26 is configured to deactivate the first and second radiant heating panels 18, 62 in order to conserve energy.

In contrast, when a target such as the legs L are present in the radiant heating zone 12 (see FIG. 3b), the two IR sensor features 20, 64 are blocked from detecting the temperature of the opposed radiant heating panels 18, 62. Instead, the two IR sensor features 20, 64 detect the relatively cold temperature of the skin or clothing on the legs L. When that temperature data is provided from the IR sensor features 20, 64 to the controller 26, a target presence condition is recognized and the controller 26 is configured to maintain the first and second radiant heating panels 18, 62 activated until manually deactivated by the operator or by the controller automatically to maintain a desired comfort level or target temperature as detected or monitored by the IR sensor features 20, 64.

Figure 4A:
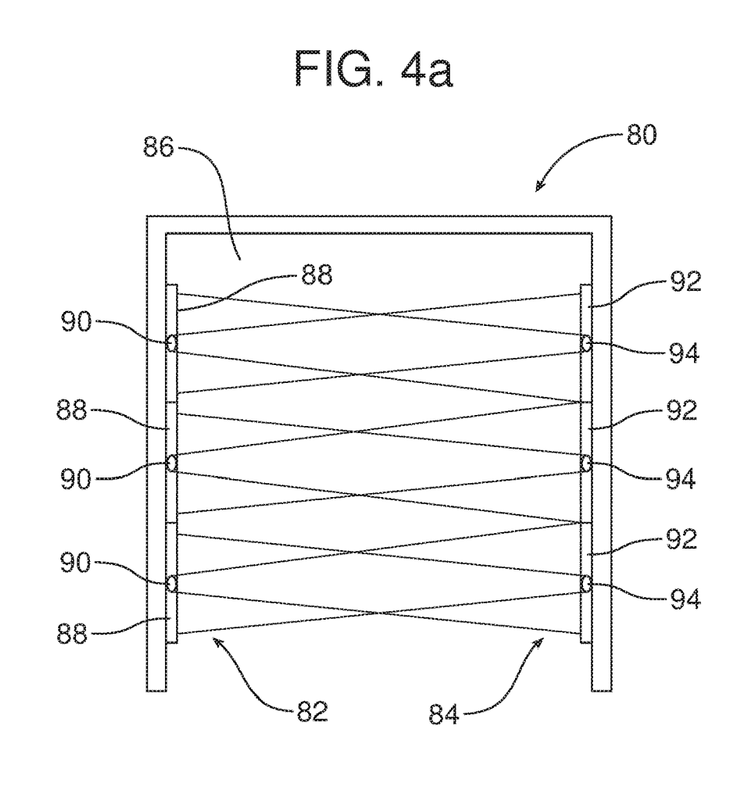
FIG. 4a is a schematic illustration of a fourth embodiment of the radiant heating system illustrating operation of that radiant heating system when no target is located in the radiant heating zone.
Figure 4B:
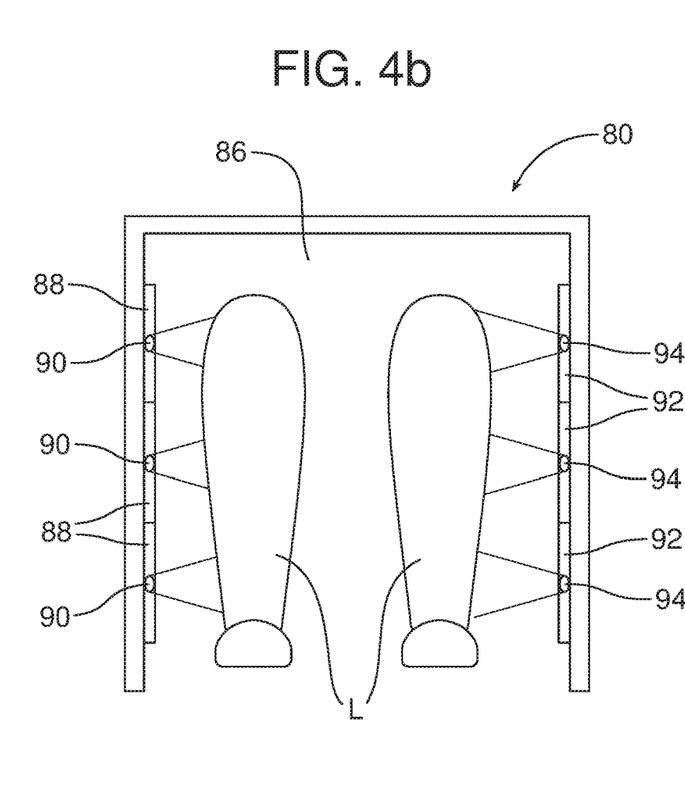
FIG. 4b is a view similar to FIG. 4a but illustrating operation of the radiant heating system when a target is located in the radiant heating zone.
Figure 4C:
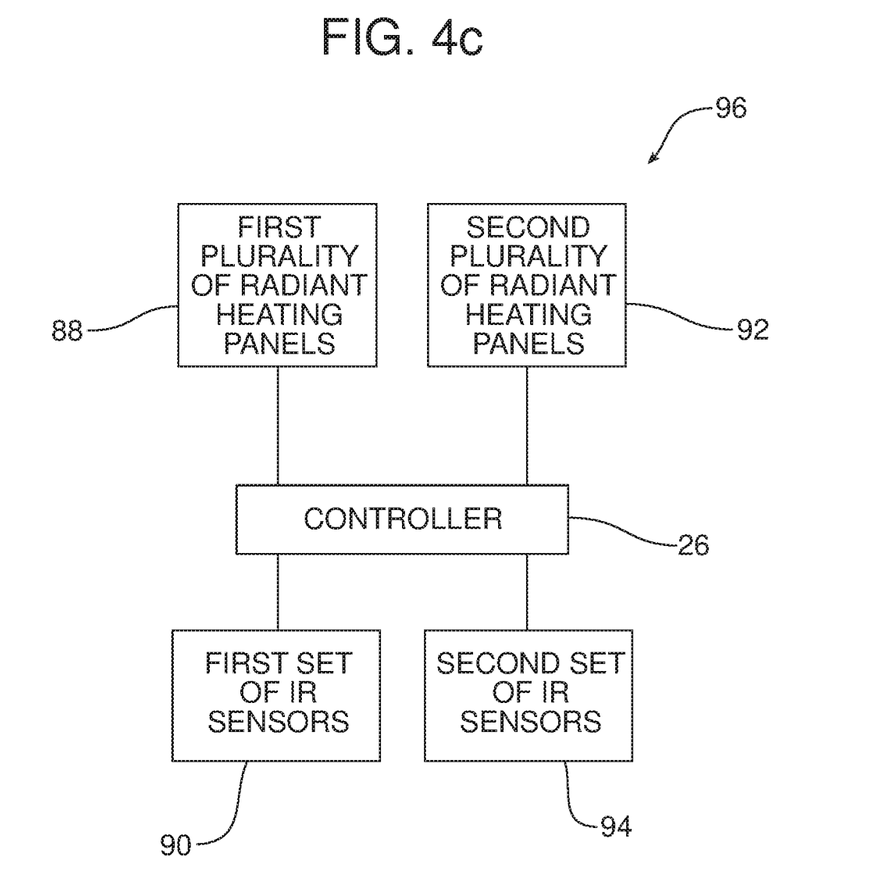
FIG. 4c is a schematic block diagram illustrating the control architecture for the radiant heating system embodiment illustrated in FIGS. 4a-4b.

FIGS. 4a-4c illustrate yet another possible embodiment of radiant heating system 80. As illustrated, the radiant heating system 80 includes a first radiant heating feature 82 and a second radiant heating feature 84 on opposite sides of a radiant heating zone 86.

More particularly, the first radiant heating feature comprises a first plurality of radiant heating panels 88 and a first plurality or set of IR sensors 90 while the second radiant heating feature 84 comprises a second plurality of radiant heating panels 92 and a second plurality or set of IR sensors 94.

FIG. 4c illustrates the control architecture 96 for the radiant heating system 80 wherein the controller 26 is connected to the first plurality of radiant heating panels 88, the second plurality of radiant heating panels 92, the first plurality of IR sensors 90 and the second plurality of IR sensors 94.

As illustrated on FIG. 4a, when the first plurality of radiant heating panels 88 and the second plurality of radiant heating panels 92 are activated by occupant input or auto control, the first set of IR sensors 90 detect the temperature of the second plurality of radiant heating panels 92 and the second plurality of IR sensors 94 detect the temperature of the first plurality of radiant heating panels 88. When this temperature data is provided by the first and second set of IR sensors 90, 94 to the controller 26, a no-object or no-target condition is recognized and the controller deactivates the first and second plurality of radiant heating panels 88, 92 in order to conserve energy.

In contrast, as illustrated in FIG. 4b, when a target such as the legs L are present in the radiant heating zone 86, the legs block the first plurality of IR sensors 90 and the second plurality of IR sensors 94 from detecting the temperature of the respective opposed first plurality of radiant heating panels 88 and second plurality of radiant heating panels 92. Instead, the first and second plurality of IR sensors 90, 94 detect the temperature of the relatively cold skin or clothing surrounding the legs L. When this temperature data is provided to the controller 26, an object or target presence condition is recognized and the controller maintains the first and second plurality of radiant heating panels 88, 92 in an activated state until manually deactivated by the operator or by the controller automatically to maintain a desired skin or clothing temperature as detected and monitored continuously by the first and second plurality of IR sensors 90, 94.

Figure 5A:
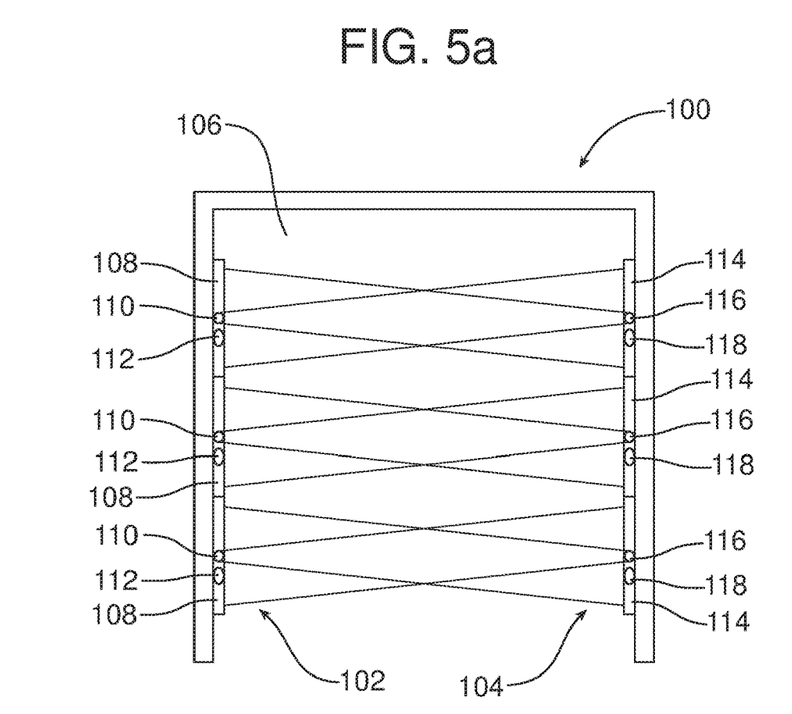
FIG. 5a is a schematic illustration of a fifth embodiment of the radiant heating system illustrating operation of that radiant heating system when no target is located in the radiant heating zone.
Figure 5B:
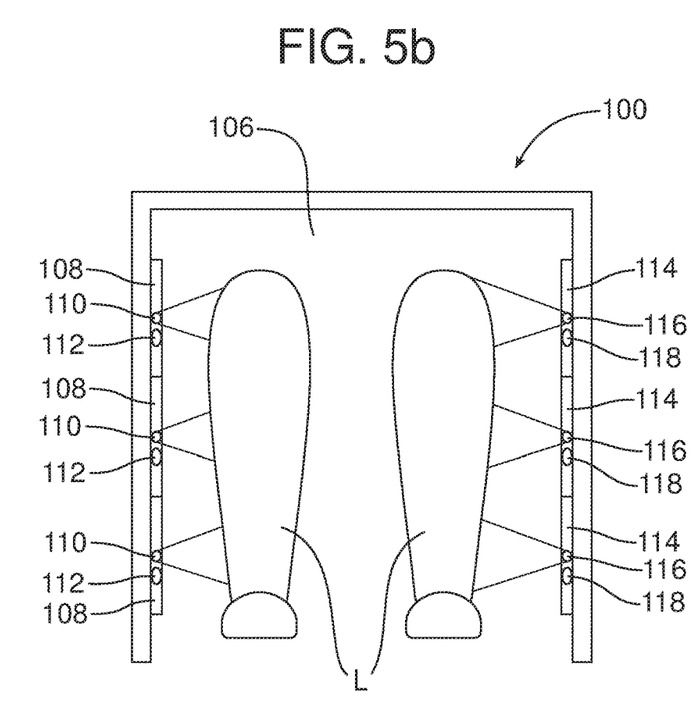
FIG. 5b is a view similar to FIG. 5a but illustrating operation of the radiant heating system when a target is located in the radiant heating zone.
Figure 5C:
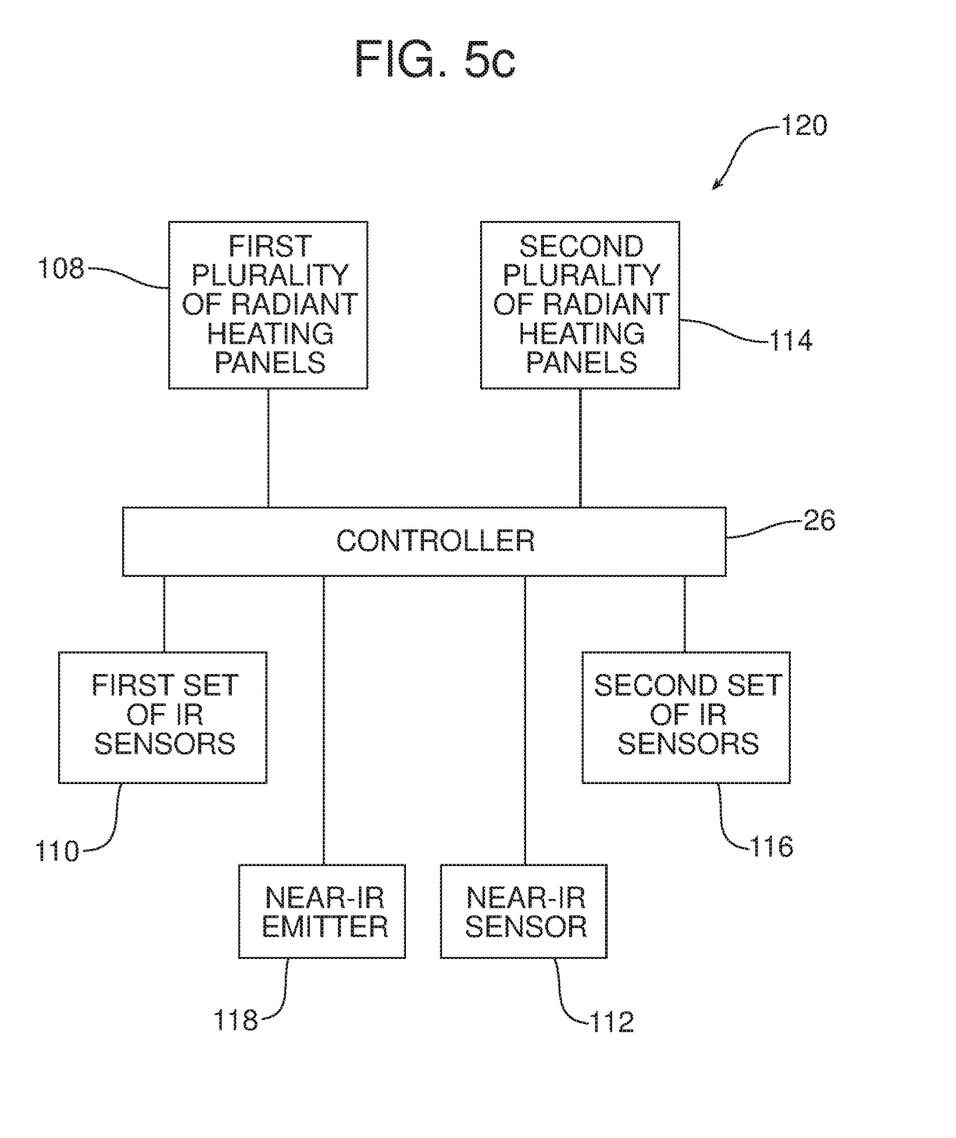
FIG. 5c is a schematic block diagram illustrating the control architecture for the radiant heating system embodiment illustrated in FIGS. 5a-5b.

FIGS. 5a-5c illustrate yet another possible embodiment of radiant heating system 100. That radiant heating system 100 includes a first radiant heating feature 102 and a second radiant heating feature 104 at opposite sides of a radiant heating zone 106.

The first radiant heating feature 102 includes a first plurality of radiant heating panels 108, a first plurality of IR sensors 110 and a plurality of near-IR sensors 112. The second radiant heating feature 104 includes a second plurality of radiant heating panels 114, a second plurality of IR sensors 116 and a plurality of near-IR emitters 118. The control architecture 120 for the radiant heating system 100 is illustrated in FIG. 5c. As illustrated, the controller 26 is operatively connected to the first plurality of radiant heating panels 108, the second plurality of radiant heating panels 114, the first plurality of IR sensors 110, the second plurality of IR sensors 116, the plurality of near-IR sensors 112 and the plurality of near-IR emitters 118.

When the radiant heating system 100 is activated by occupant input or auto control, the near-IR emitters 118 are energized and near-IR radiation is directed from those emitters toward the near-IR sensors 112 at the opposite side of the radiant heating zone 106. Detection of the near-IR radiation by the near-IR sensors 110 is recognized by the controller 26 as an indication of no object or target in the radiant heating zone 106. Thus, the controller 26 does not activate the first and second plurality of radiant heating panels 108, 114 in order to save energy. See FIG. 5a illustrating this situation.

In contrast, as illustrated in FIG. 5b, when a target such as the legs L are present in the radiant heating zone 106, when the radiant heating system 100 is activated, the near-IR radiation emitted by the near-IR emitters 118 does not reach one or more of the near-IR sensors 112 which is a situation indicative of the presence of an object or target in the radiant heating zone 106. Accordingly, when such data is provided to the controller 26 from the near-IR sensors 112, the controller activates the first and second plurality of radiant heating panels 108, 114 to provide heat for the legs L. The first and second plurality of radiant heating panels 108, 114 are maintained in an activated state until deactivated by occupant input or other control such as auto control to maintain the skin or clothing around the legs L at a desired temperature as continuously or intermittently monitored by the first and second plurality of IR sensors 110, 116.

Figure 6A:
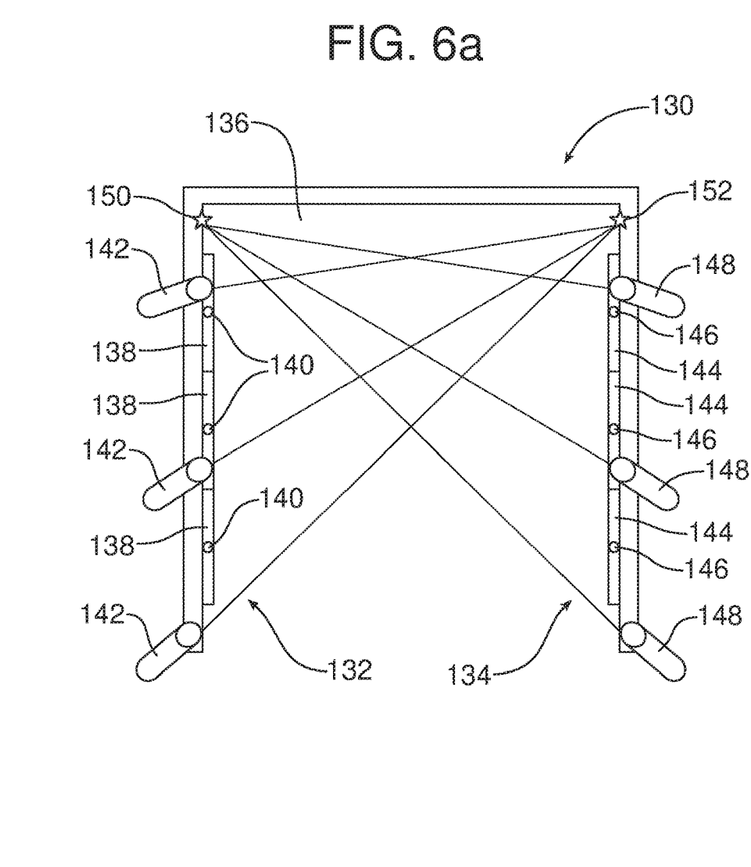
FIG. 6a is a schematic illustration of a sixth embodiment of the radiant heating system illustrating operation of that radiant heating system when no target is located in the radiant heating zone.
Figure 6B:
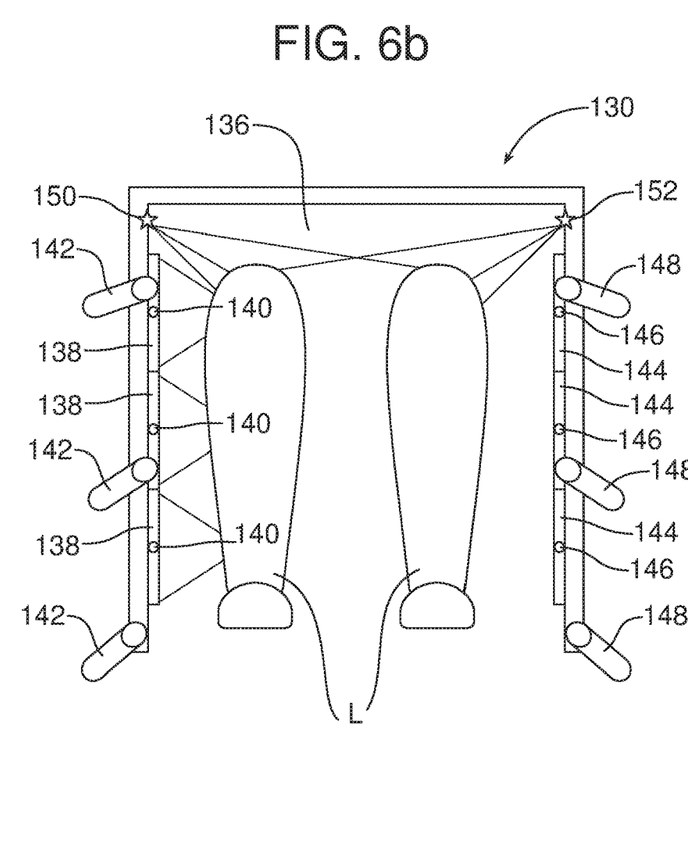
FIG. 6b is a view similar to FIG. 6a but illustrating operation of the radiant heating system when a target is located in the radiant heating zone.
Figure 6C:
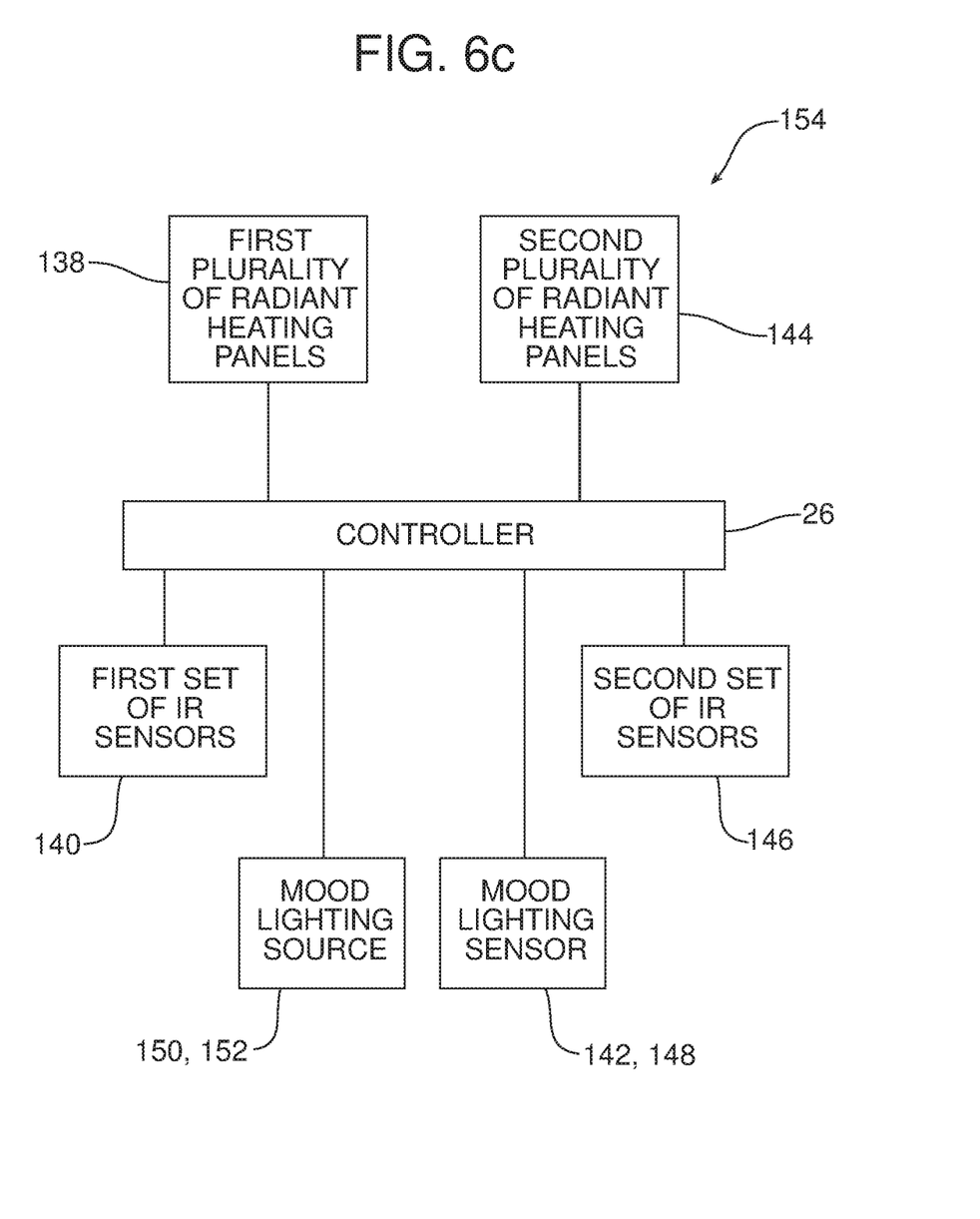
FIG. 6c is a schematic block diagram illustrating the control architecture for the radiant heating system embodiment illustrated in FIGS. 6a-6b.

FIGS. 6a-6c illustrate yet another possible embodiment of radiant heating system 130 including a first radiant heating feature 132 and a second radiant heating feature 134 on opposite sides of a radiant heating zone 136. In the illustrated embodiment, the first radiant heating feature 132 comprises a first plurality of radiant heating panels 138, a first plurality of IR sensors 140 and a first plurality of mood lighting sensors 142. The second radiant heating feature 134 comprises a second plurality of radiant heating panels 144, a second plurality of IR sensors 146 and a second plurality of mood lighting filtered/shielded sensors 148.

As further illustrated in FIGS. 6a and 6b, the first radiant heating feature 132 may also include a first mood lighting source such as the LED 150 while the second radiant heating feature 134 may include a second mood lighting source such as the LED 152.

FIG. 6c illustrates the control architecture 154 for the radiant heating system 130. As shown, the controller 26 is connected to the first plurality of radiant heating panels 138, the second plurality of radiant heating panels 144, the first set of IR sensors 140, the second set of IR sensors 146, the two mood lighting sources 150, 152 and the two sets of mood lighting sensors 142, 148.

As illustrated in FIG. 6a, mood lighting from the first mood lighting source 150 is directed across the radiant heating zone 136 toward the second plurality of mood lighting sensors 148 while mood lighting from the second mood lighting source 152 is directed across the radiant heating zone toward the first plurality of mood lighting sensors 142. When the two mood lighting sources 150, 152 are activated, and no target is in the radiant heating zone 136, the mood lighting is detected by the first and second plurality of mood lighting sensors 142, 148 which provide a data signal to the controller 26 indicative of no object or target in the radiant heating zone 136. Accordingly, the controller 26 is configured to maintain the first and second plurality of radiant heating panels 138 and 144 in an inactive state in order to conserve energy. It should be appreciated that the mood lighting sensors 142, 148 may be filtered or shielded in order to increase their ability to detect the light from the mood lighting sources 150, 152 and distinguish that light from other sources.

If mood lighting is not in use and the first and second mood lighting sources 150, 152 are deactivated, object presence detection is still possible. More specifically, the first and second plurality of radiant heating panels 138 and 144 are activated by occupant input or auto control. Where no object is present in the radiant heating zone 136, the second plurality of IR sensors 146 detect the temperature of the first plurality of radiant heating panels 138 while the first plurality of IR sensors 140 detect the temperature of the second plurality of radiant heating panels 144. Temperature data signals provided by the first plurality of IR sensors 140 and the second plurality of IR sensors 146 to the controller 26 in this situation are indicative of a no target presence in the radiant heating zone 136. Accordingly, the controller 26 is configured to deactivate the first and second plurality of radiant heating panels 138 and 144 in order to conserve energy.

In contrast, where a target such as the legs L are present in the radiant heating zone 136, light from the mood lighting sources 150, 152 is blocked from reaching one or more of the first and second plurality of mood lighting sensors 142, 148. When such data is provided by the first and second plurality of mood lighting sensors 142, 148 to the controller 26, that data is recognized by the controller 26 as being indicative of a target presence signal and the controller is configured to activate the first and second plurality of radiant heating panels 138, 144. See FIG. 6b.

In a situation where the mood lighting sources 150, 152 were not activated at the time of activation of the radiant heating system 130, the presence of the legs L in the radiant heating zone 136 would block one or more of the first plurality of IR sensors 140 from detecting the temperature of the opposed second plurality of heating panels 144 or one or more of the second plurality of IR sensors 146 from detecting the temperature of one or more of the first plurality of radiant heating panels 138. When such data is provided by the first and second plurality of IR sensors 140, 146 to the controller 26, it is indicative of the presence of a target in the radiant heating zone 136. In such a situation the controller 26 is configured to maintain the first and second plurality of radiant heating panels 138, 144 in an activated state until an occupant input deactivates those heating panels or other control signal is received from the controller.

Consistent with the above description, a method of radiant heating is provided. That method includes the steps of providing a first radiant heating feature 14 on a first side of a radiant heating zone 12 and a second radiant heating feature 16 on a second side of a radiant heating zone, detecting the presence of a target, such as legs L, to be heated in the radiant heating zone and directing radiant heat toward that target.

The method may further include the step of using IR sensors 20, 22 to detect the presence of the target in the radiant heating zone 12. In some embodiments, the method may include using a near-IR emitter 118 and a cooperating near-IR sensor 112 to detect the presence of the target in the radiant heating zone 106. In other embodiments, the method may include using a mood lighting source 150, 152 and a cooperating mood lighting filtered/shielded sensor 142, 148 to detect the presence of the target in the radiant heating zone 136.

The method may also include configuring a controller 26 to control the first radiant heating feature 14, and the second radiant heating feature 16 in response to detecting the presence of the target in the radiant heating zone 12 and/or in response to the current heat level of the target in the radiant heating zone as detected by the first and second IR sensors 20, 22.

In summary, numerous benefits and advantages are provided by the various embodiments of the radiant heating system 10, 50, 60, 80, 100, 130 disclosed in this document. The use of IR sensors in conjunction with radiant heating panels allows one to monitor for the presence of a target within a radiant heating zone. This allows automatic deactivation of radiant heating panels when no target is present for heating thereby conserving energy. At the same time the plurality of IR sensors allow for monitoring of the temperature of the target, such as skin or clothing, thereby allowing the radiant heating system 10, 50, 60, 80, 100, 130 to maintain the target at a desired temperature for optimum comfort. Where the radiant heating system 80, 100, 130 incorporates a plurality of radiant heating panels 88, 92/108, 114/138, 144 and a plurality of IR sensors 90, 94/110, 116/140, 146, it is possible to monitor the exact position of a target in the radiant heating zone 86, 106, 136. This allows for intelligent control and the controller 26 may be configured to only activate those radiant heating panels in the best position for most efficient heating of the target. This allows conservation of energy and greater heating efficiency. Such radiant heating systems 10, 50, 60, 80, 100, 130 also allow for heating the coldest areas of the target first in order to provide a rapid heating effect for the comfort and satisfaction of the occupant. Advantageously, the IR sensors 20, 22, 64, 90, 94, 110, 116, 140, 146 also allow for efficient regulation of heat while optimizing comfort and maximizing energy conservation.

The use of multiple IR-sensors or arrays of such sensors further allows the controller 26 to monitor the movements of a target in a radiant heating zone and adjust the operation of the individual radiant heating panels, by activation, deactivation or change in intensity, to quickly establish and efficiently maintain a desired comfort temperature.

While not described above, it should be appreciated that the radiant heating system may include other data inputs and make use of additional data for more efficient and effective operation. For example, ambient temperature data may be provided from an ambient temperature sensor to the controller 26 to aid in calculation of target temperatures for comfort. As another example, solar load sensors may be utilized to measure incoming solar load. This data may be utilized by the controller 26 to determine if solar energy is impacting a near-IR or IR temperature sensor causing a false reading. Further, the controller 26 may be configured to or calibrated to use the solar load sensor data to adjust temperature or energy readings and increase the accuracy of the radiant heating system for added occupant comfort.

It should further be appreciated that while the radiant heating zone in the illustrated embodiments is a footwell, other zones are possible. For example, the radiant heating zone could be defined between the center console and the door, between the floor and the headliner or still other positions within the motor vehicle.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A radiant heating system, comprising:
    a radiant heating zone;
    a first radiant heating feature on a first side of said radiant heating zone, said first radiant heating feature including a first mood lighting source;
    a second radiant heating feature across said radiant heating zone from said first side, said second radiant heating feature including a first mood lighting sensor wherein said first mood lighting source is configured to direct mood lighting across the radiant heating zone toward said first mood lighting sensor; and
    a controller configured to control operation of said first radiant heating feature and said second radiant heating feature, said controller being configured to maintain said first radiant heating feature and said second radiant heating feature in an inactive state to conserve energy when mood lighting from the first mood lighting source reaches the first mood lighting sensor indicating no target in the radiant heating zone.

2. The radiant heating system of claim 1, wherein said first radiant heating feature includes a first radiant heat source and a first IR sensor feature.

3. The radiant heating system of claim 2, wherein said second radiant heating feature includes a second IR sensor feature.

4. The radiant heating system of claim 2, wherein said second radiant heating feature is an IR specular element.

5. The radiant heating system of claim 2, wherein said second radiant heating feature is a second radiant heat source and a second IR sensor feature.

6. The radiant heating system of claim 5, wherein said first radiant heat source is a first radiant heating panel and said second radiant heat source is a second radiant heating panel.

7. The radiant heating system of claim 5, wherein said first radiant heat source is a first plurality of radiant heating panels and said second radiant heat source is a second plurality of radiant heating panels.

8. The radiant heating system of claim 7, wherein said first IR sensor feature comprises a first plurality of IR sensors, one IR sensor of said first plurality of IR sensors being provided on each of said first plurality of radiant heating panels.

9. The radiant heating system of claim 8, wherein said second IR sensor feature comprises a second plurality of IR sensors, one IR sensor of said second plurality of IR sensors being provided on each of said second plurality of radiant heating panels.

10. The radiant heating system of claim 5, wherein said first radiant heating feature further includes at least one near-IR emitter and said second radiant heating feature further includes at least one near-IR sensor.

11. The radiant heating system of claim 1, wherein said first radiant heating feature further includes a second mood lighting sensor and said second radiant heating feature further includes a second mood lighting source.

12. The radiant heating system of claim 11, wherein said controller is further configured to respond to detection of a target to be heated in said radiant heating zone by activating said first radiant heating feature and said second radiant heating feature.

13. The radiant heating system of claim 12, wherein said radiant heating zone is a footwell of a motor vehicle.

* * * * *